Figures 1, 2, 3:
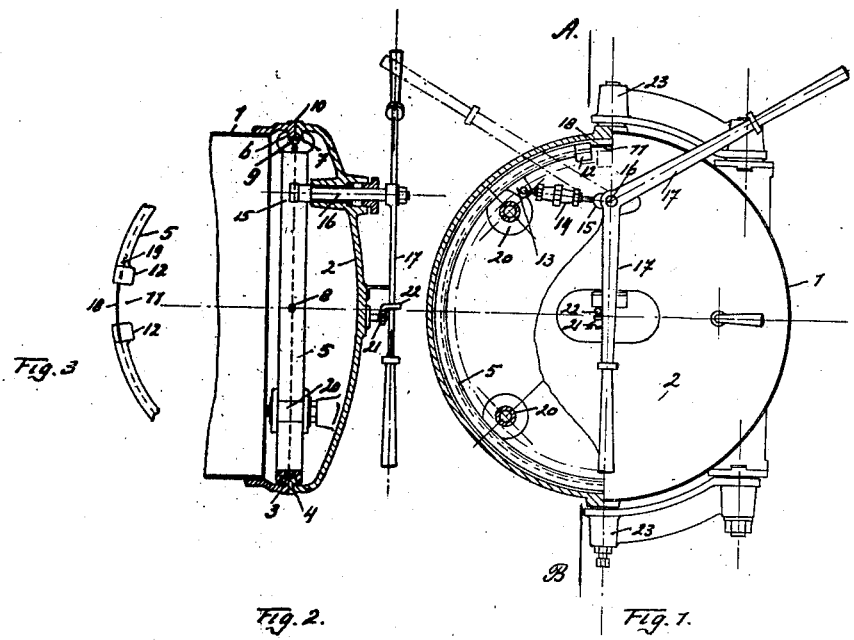

K. ENSINK.
LOCKING DEVICE FOR AUTOCLAVES.
APPLICATION FILED APR. 7, 1921.

1,382,489.

Patented June 21, 1921.

Inventor
Klaas Ensink
By
Attorney

UNITED STATES PATENT OFFICE.

KLAAS ENSINK, OF HILVERSUM, NETHERLANDS.

LOCKING DEVICE FOR AUTOCLAVES.

1,382,489. Specification of Letters Patent. Patented June 21, 1921.

Application filed April 7, 1921. Serial No. 459,471.

*To all whom it may concern:*

Be it known that I, KLAAS ENSINK, citizen of the Netherlands, residing at Hilversum, Stadhouderslaan 28, Netherlands, have invented certain new and useful Improvements in Locking Devices for Autoclaves, of which the following is a specification.

In autoclaves, vulcanizers and similar apparatus, which are used in various branches of chemical industry as ordinarily constructed, the locking of the apparatus is effected by outward flanges, cast with the shell and door of the apparatus, which are bolted together by means of swinging bolts, attached to the shell.

Now by this construction great inconvenience arises, when opening and closing the apparatus, as a large number of nuts have to be unscrewed. Moreover, the large number of swinging bolts makes the construction very expensive and also leads to considerable wearing and fractures. Besides, the loss of time during opening and closing, influences the relation between production and wages very unfavorably; the cooling down of the apparatus during this period means a loss of heat, and influences also, in some cases, the quality of the product, especially if it requires a very constant temperature.

Further the safety has not proved to be beyond doubt, on account of unequal or insufficient tightening of the bolts, which leads to leakages and fractures and under certain conditions, to explosions.

The present invention has for its object to remedy the disadvantages referred to.

Moreover the device lends itself to be connected with an arrangement for letting off the pressure in the apparatus before the device is wholly unlocked.

With these objects in view both the door and the shell, instead of having the usual outward flanges, are provided with circular inward flanges, which flanges fit into a circular groove of an adjustable elastic metal ring attached to the door, the groove being provided with a circular elastic packing ring, the inner surface of which is exposed to the working pressure of the apparatus, in order to press its outer surface against the circular surface of both flanges and cover up the seam between said flanges in a steamtight manner.

For the adjustment of the elastic circular metal ring, the door is on its outside provided with a suitable lever mounted on a spindle passing through a steamtight bearing in the said door, two eccentrics being keyed to said spindle and two turnbuckles for connecting the ends of the ring to the eccentrics to regulate their distance, so that by turning the lever the diameter of the ring may be changed in accordance with the opening or closing position of the door.

By connecting the above mentioned lever to the handle of a blow off cock mounted on the door, the cock may be opened and the pressure let off when moving the lever to its opening position.

A constructional form of the locking device according to the invention is shown on the accompanying drawing.

Figures 4, 5:
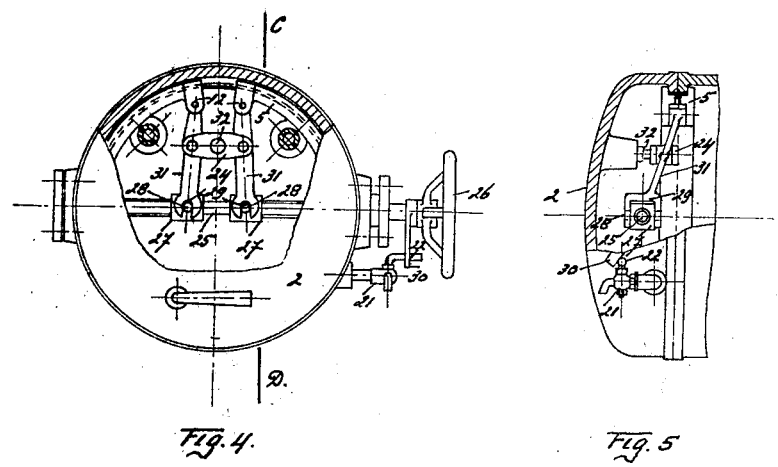

Figure 1 is a plan view of the apparatus with the door partly removed, Fig. 2 is a vertical section along the line A.— B.— in Fig. 1; Fig. 3 is a sectional view of the metal ring, the packing ring and the flanges on an enlarged scale; Fig. 4 is a plan view of the apparatus with the door partly removed, showing another arrangement for reducing the diameter of the metal ring; Fig. 5 is a vertical section along the line C.— D. in Fig. 4.

1 is the shell of the apparatus, 2 the door, 3 and 4 the inward flanges cast on the shell and the door, 5 is the elastic metal ring having a groove 6, wherein the flanges 3 and 4 fit when the door is closed. 7 is the elastic packing ring, which may be made of rubber or like material, its inner surface being exposed to the working pressure of the apparatus by means of the borings 8 and a groove 9 in the ring 7 in order to press its outer surface against the flanges 3 and 4, when the door is in its closing position and to cover the seam 10 between said flanges in a steamtight manner. In order to open the door the diameter of the ring 5 has to be reduced so far that the flanges 3 and 4 are free from the groove 6, which reduction is effected by connecting each end 12 of the ring 5 by means of an eye 13 and a turnbuckle 14 (on the drawing only one such connection is shown) to one of a pair of eccentrics 15, which are keyed to a spindle 16, disposed in a steamtight bearing in the door 2, the arrangement being such that by turning the lever 17, keyed to said spindle 16, the ends 12 of the ring 5 are pulled toward each other and the diameter of the ring 5 is reduced so far, that the flanges 3 and 4 are free from the groove.

The space 11 between the ends of the ring 7 is bridged by means of a steel spring 18, which is at 19 fastened to the ring 5 and presses the packing ring against the flanges 3 and 4 in order to prevent a leakage at the space 11. In order to keep the ring 5 concentric with the vertical axis of the apparatus the door is provided with guide rollers 20.

To prevent an opening of the door before the pressure in the apparatus is being let off, a cock 21 is mounted on the door, having a handle 22 resting against the lever 17, when the latter is in its closing position, so that when turning the lever 17 the handle of the cock 21 will be brought in its opening position, through contact of the lever with the said cock.

It will be obvious that the operation of opening and closing the apparatus in a very simple one, as only the lever 17 has to be moved and the door has to be turned on its hinges 23.

The construction is safe as the ring 5 when released has a greater diameter than accords with that of the flanges and for that reason expands of its own accord, as soon as the lever is free from the rest. Besides the strains in the ring coöperate with the steam pressure.

Also the packing material is closed up from all sides. The diameter of the metal ring 5 may also be reduced by means as shown in Figs. 4 and 5. Instead of the turnbuckles 14, the eccentrics 15 and lever 17, two levers 31 are used, pivoted to a connecting piece 24, the latter being fastened at 32 to the door 2 in a rotative manner. A left and right handed threaded spindle 25, turnable by means of a handwheel 26 and provided with nuts 27, having pins 28, adapted to engage the slotted ends 29 of the levers 31, serves to contract or relieve the metal ring 5.

The operation of the cock 23 is effectuated by means of a lever 30, keyed to the spindle 25.

Having now particularly described and ascertained the nature of my said invention and in what manner the same is to be performed, I declare that what I claim is:

1. A locking device for autoclaves comprising inward circular flanges provided on the shell and the door of the autoclave, a circular elastic packing ring resting against both flanges, an adjustable elastic metal ring, having a groove wherein fit said flanges and packing ring, and means to reduce the diameter of said elastic metal ring from the outside of the apparatus in order to bring the door in its opening position.

2. A locking device for autoclaves comprising inward circular flanges provided on the shell and the door of the autoclave, a circular elastic packing ring resting against both flanges, an adjustable elastic metal ring having a groove wherein fit said flanges and packing ring, guiding rollers attached at the inside of the door for maintaining the metal ring concentric with the vertical axis of the apparatus, said rollers having flanges for carrying said metal ring, and means to reduce the diameter of said elastic metal ring from the outside of the apparatus in order to bring the door in its opening position.

3. A locking device for autoclaves comprising inward circular flanges provided on the shell and the door of the autoclave, a circular elastic packing ring resting against both flanges, an adjustable elastic metal ring having a groove wherein fit said flanges and packing ring, a spring bridging over the space between the ends of the elastic metal ring and fitting in the groove of said ring, said spring being connected to said ring at one end, and means to reduce the diameter of the elastic metal ring from the outside of the apparatus in order to bring the door in its opening position.

4. In a locking device for autoclaves constructed and arranged substantially as described and illustrated, the combination with a blow off cock mounted on the door of the apparatus, said cock being provided with a handle, of means for reducing the diameter of the elastic metal ring, said reducing means being engageable with said handle in such a way that when operated to reduce the diameter of said ring and bring the door into its opening position, said handle will be shifted into position to open said cock.

5. A locking device for autoclaves, as claimed in claim 1, in which means are provided for exposing the inner surface of the packing ring to the working pressure within the autoclave.

In testimony whereof I affix my signature.

KLAAS ENSINK.

Witnesses:
H. Y. KINYJPERS,
C. GAÓRTER.